United States Patent [19]

Clark

[11] Patent Number: 4,481,623

[45] Date of Patent: Nov. 6, 1984

[54] SPEED INDEPENDENT ARBITER SWITCH EMPLOYING M-OUT-OF-N CODES

[75] Inventor: Becky J. Clark, Del Mar, Calif.

[73] Assignee: Burroughs Corporation, Detroit, Mich.

[21] Appl. No.: 443,967

[22] Filed: Nov. 23, 1982

[51] Int. Cl.³ ............................................. H04J 6/00
[52] U.S. Cl. .............................. 370/60; 340/825.02; 307/243; 328/154
[58] Field of Search ................... 370/60, 94, 112, 58; 340/825.02, 825.03, 825.04; 307/241, 242, 243; 178/3; 328/154

[56] References Cited

U.S. PATENT DOCUMENTS 3,633,163  1/1972  Birchmeier .............. 340/825.02
4,149,240  4/1979  Misunas et al. ................ 370/94
4,251,879  2/1981  Clark .......................... 370/60
4,307,378  12/1981  Clark .......................... 370/60
4,314,233  2/1982  Clark .......................... 370/60

Primary Examiner—Douglas W. Olms
Attorney, Agent, or Firm—Charles J. Fassbender; Kevin R. Peterson

[57] ABSTRACT

Disclosed is an arbiter comprised of two input ports and one output port; each input port has N input data lines, and the one output port has N output data lines; one circuit in the arbiter selects only one of the two input ports at a time; and another circuit in the arbiter passes characters from the selected input port to the output port. Each of the characters is represented by active logic signals on M-out-of-N data lines on the selected input port, with M being at least two and N being greater than M and greater than three.

9 Claims, 8 Drawing Figures

SPEED INDEPENDENT ARBITER SWITCH EMPLOYING M-OUT-OF-N CODES

BACKGROUND OF THE INVENTION

This invention relates to arbiters and selectors, and networks of the same.

In general, an arbiter is a logic circuit having two input ports and one output port; and in operation, messages are passed from either input port to the output port. One prior art arbiter is described, for example, in the U.S. Pat. No. 4,251,879 issued Feb. 17, 1981 to Becky J. Clark, who is also the inventor in the present application.

Also in general, a selector is a logic circuit having one input port and two output ports; and in operation, messages are passed from the one input port to a selectable one of the two output ports. One prior art selector is described, for example, in U.S. Pat. No. 4,237,447 issued Dec. 2, 1980 to the same Becky J. Clark.

Now a limitation which the above-cited arbiters and selectors have is that they only operate on bit serial messages. That is, the messages which pass from their input ports to their output ports do so only one bit at a time. Thus, the maximum baud rate at which those arbiters and selectors operate is relatively low.

To increase that baud rate, one might try arranging a number of the above-cited arbiters and selectors in parallel. But a problem with such a parallel arrangement is that multiple bits would not pass through the parallel paths in synchronization with each other. This is because the arbiters choose one of their input ports or the other in a random fashion when requests arrive on both input ports simultaneously. Thus, multiple bits sent from one source through a parallel arrangement of the above-cited arbiters and selectors would reach their destination in an unpredictable and highly scrambled fashion.

Accordingly, a primary object of the present invention is to provide an improved arbiter.

Another object of the invention is to provide an arbiter which passes multiple bits in parallel from its input ports to its output port.

BRIEF SUMMARY OF THE INVENTION

These and other objects are accomplished in accordance with the invention by an arbiter having two input ports and one output port. Each of the input ports has N input data lines, and the one output port has N output data lines. One circuit is included in the arbiter for selecting only one of the two input ports at a time; and another circuit is included for passing characters from the selected input port to the output port. Each character that is passed is represented by active logic signals on M-out-of-N of the data lines on the selected input port, with M being at least two and N being greater than M and greater than three.

BRIEF DESCRIPTION OF THE DRAWINGS

Various features and advantages of the invention will best be understood by reference to the following detailed description and accompanying drawings wherein.

DETAILED DESCRIPTION OF THE INVENTION

Figure 1:
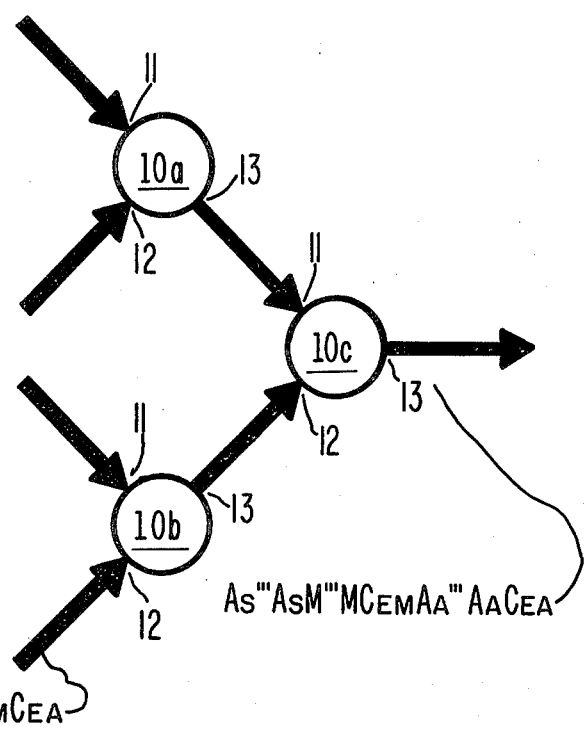
FIG. 1 illustrates a system of arbiters that are constructed in accordance with the invention.

One preferred embodiment of the invention will now be described in detail in conjunction with FIGS. 1 through 6. To begin, FIG. 1 illustrates an example of how three arbiters 10A, 10B, and 10C, each of which is constructed according to the invention, can be interconnected as a system. Of course, any other number of arbiters and selectors can also be interconnected in an input-port-to-output-port fashion to form other systems as well.

Arbiters 10A, 10B, and 10C are identical to each other; and the letters A, B, and C are appended only to identify the position of those arbiters in the system. Each arbiter includes two input ports and one output port. In FIG. 1, reference numerals 11 and 12 indicate respective input ports while reference numeral 13 indicates the output port.

In the system of FIG. 1, the output ports of arbiters 10A and 10B are connected to respective input ports of arbiter 10C. And in operation, messages are sent from any of the input ports of arbiters 10A and 10B to the output port of arbiter 10C. Each message as it is put into the arbiter system has the format $A_S \ldots A_S M \ldots MC_{EM}A_A \ldots A_A C_{EA}$; and each message after it has passed to output port 13 of arbiter 10C has the format $A_S \ldots A_S M \ldots MC_{EM}A_A \ldots A_A C_{EA}$.

In the above-described message formats, each of the symbols $A_S$, M, $C_{EM}$, $C_{EA}$, and $A_A$ stands for one character. And that character is represented by an M-out-of-N code. That is, each of the input ports 11 and 12, and output port 13 in the arbiters includes N data lines; and characters on those data lines are represented by signals on M-out-of-N of the lines being in an active state.

Also in the above message formats, the symbol M represents a character in the body of the message; whereas the symbols $A_S$, $C_{EM}$, $C_{EA}$, and $A_A$ represent control characters. Control character $A_S$ is utilized in conjunction with a selector network (not shown) which, if desired, could be coupled to output port 13 of arbiter 10C. Control character $C_{EM}$ is utilized by the arbiter network itself to indicate an end of message body. One control character $A_A$ is generated by each arbiter to indicate which of its input ports the message passed through. The $A_A$ characters are two particular characters $C_0$ and $C_1$ of the set of possible characters for M. The $A_S$ characters are also the characters $C_0$ and $C_1$. And control character $C_{EA}$ is passed by the arbiters to indicate the end of an $A_A$ character string.

Figure 2:
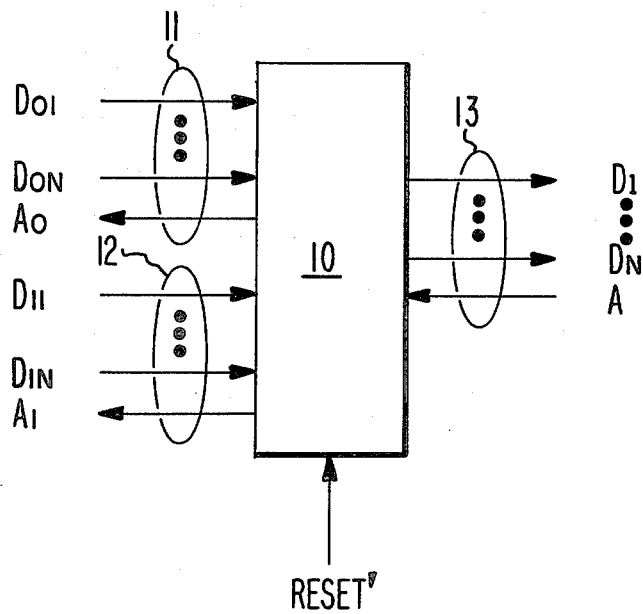
FIG. 2 a block diagram of one of the arbiters of FIG. 1.

Turning now to FIG. 2, a block diagram of one of the arbiters is there illustrated. In this block diagram, signals $D_{01} \ldots D_{0N}$ represent data signals on respective input data lines on input ports 11; signals $D_{11} \ldots D_{1N}$ indicate data signals for respective input data lines on input port 12; and signals $D_1 \ldots D_N$ indicate data signals on respective output data lines on output port 13.

Each input port also includes one input control line; and the output port also includes one output control line. Signal $A_0$ is generated by the arbiter on the input control line for input port 11; signal $A_1$ is generated by the arbiter on the input control line for input port 12; and signal A is received by the arbiter on the output control line for output port 13. In general, these signals are utilized to coordinate the transfer of characters from the data lines of an output port to the data lines of an input port.

Figure 6:
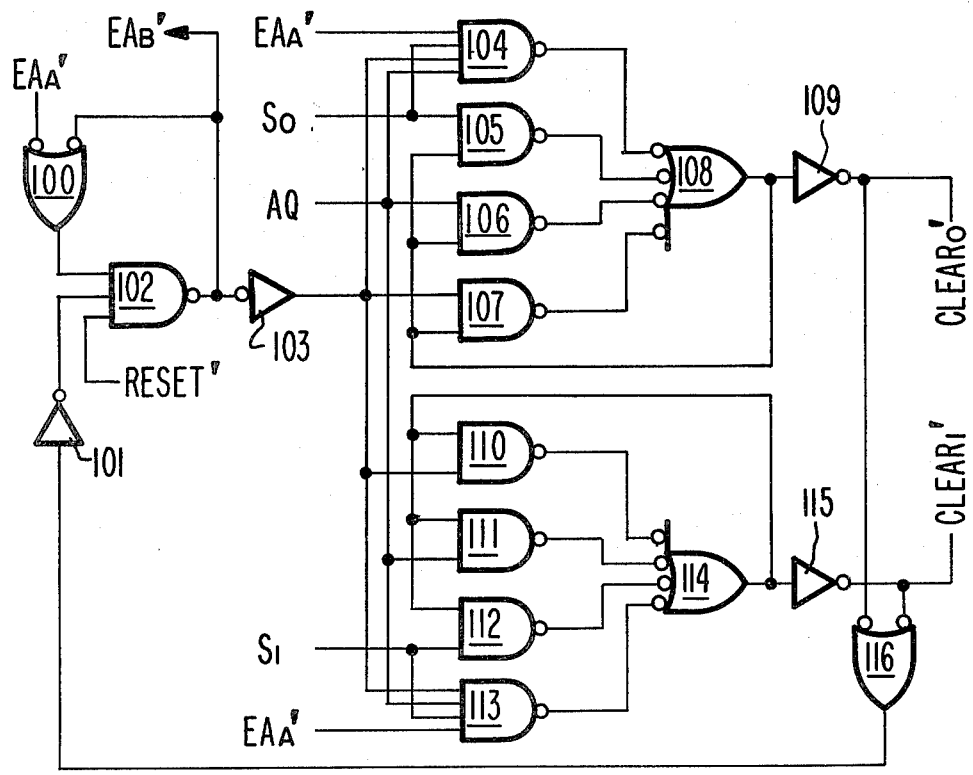

Detailed logic diagrams for a preferred embodiment of the arbiter of FIG. 2 are given in FIGS. 3, 4A, 4B, 4C, 5, and 6; and the operation of these logic circuits will now be described. In general, FIGS. 3 and 6 illustrate that portion of the arbiter which selects one of the input ports; whereas FIGS. 4A–4C and 5 illustrate that portion of the arbiter which passes characters from the selected input port to the output port.

Figure 3:
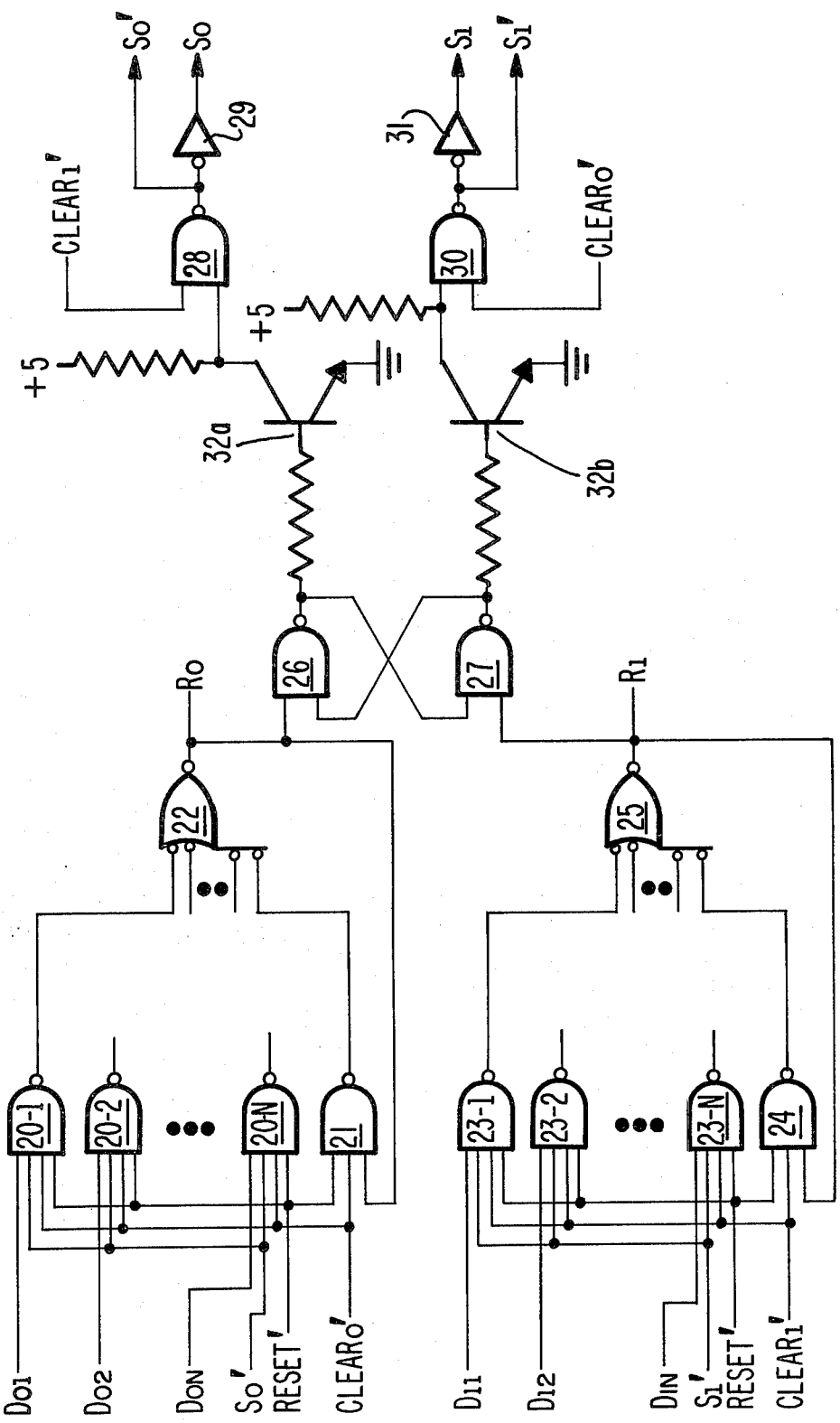
FIGS. 3 through 6 are detailed logic diagrams of one preferred embodiment of the arbiter of FIG. 2.

Consider now the logic circuit of FIG. 3. It includes a plurality of NAND gates 20-1 ... 20-N, 21, 22, 23-1 ... 23-N, and 24 through 31, plus two transistors 32A and 32B, all of which are interconnected as illustrated. NAND gates 20-1 through 20-N receive respective input data signals $D_{01}$ through $D_{0N}$ from input port 11. Similarly, NAND gates 23-1 through 23-N receive respective input data signals $D_{11}$ through $D_{1N}$ from input port 12.

Initially, input data signals $D_{01}$ through $D_{0N}$ and $D_{11}$ through $D_{1N}$ are all in their inactive state, which in this embodiment means they are low. Also initially, signals $R_0$ and $R_1$ are both low; and signals $S_0'$, $CLEAR_0'$, $S_1'$, $CLEAR_1'$, and $RESET'$ are all high. This initial state is a result of signal $RESET'$ being low for a period of time and then changing high. In this initial state, neither input port is selected.

Now when the FIG. 3 circuit is in the above-described initial state, an input port will be selected in response to any input data signal for that port becoming active. That is, if any one of the input data signals $D_{01}$ through $D_{0N}$ goes high, then input port 11 will be selected; whereas if any one of the input lines $D_{11}$ through $D_{1N}$ goes high, then input port 12 will be selected.

Suppose, for example, that input data signal $D_{01}$ goes high. In response, signal $R_0$ goes high. Then, the output of gate 21 goes low, which latches signal $R_0$ high. A high signal $R_0$ also causes the output of NAND gate 26 to go low. This in turn causes transistor 32A to turn off, so its output goes high. Then signal $S_0$ goes low which forces the output of all of the gates 20-1 through 20-N to go high. Also, signal $S_0$ from NAND gate 29 goes high, thereby indicating that input port 11 is selected.

Once an input port is selected, it stays selected until an entire message passes through it. Thus, input port 11 stays selected until a $C_{EA}$ character is received by that input port. When that occurs, the circuit of FIG. 6 will operate to return the circuit of FIG. 3 back to the above-described initial state. This return to the initial state will be described at the end of this description.

Figure 4A:
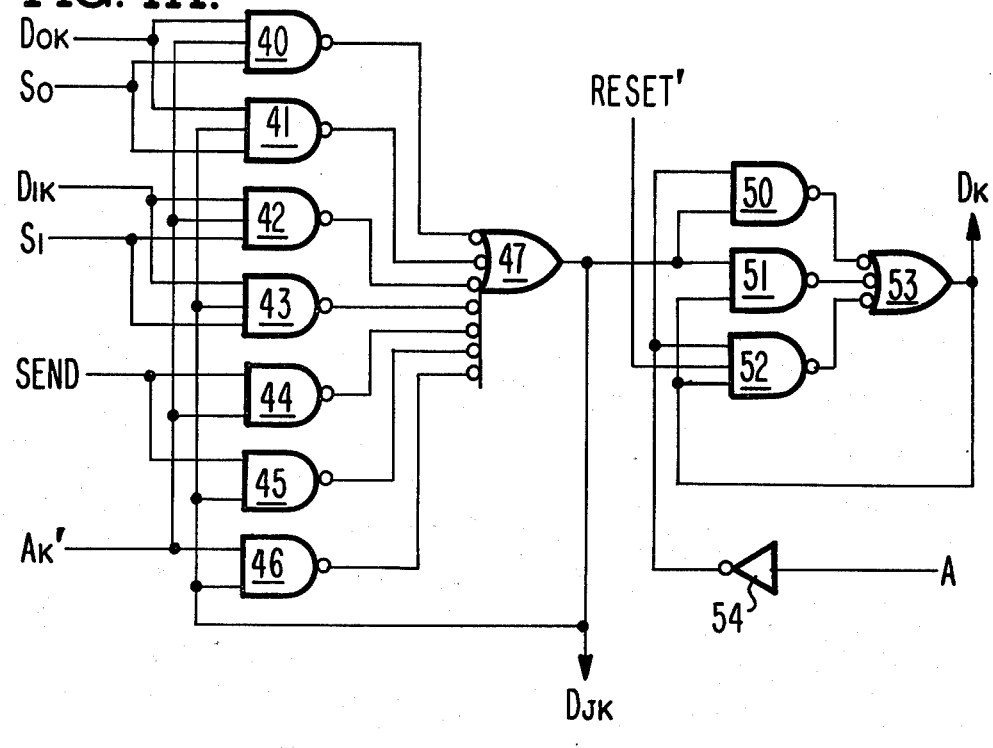
Figure 4B:
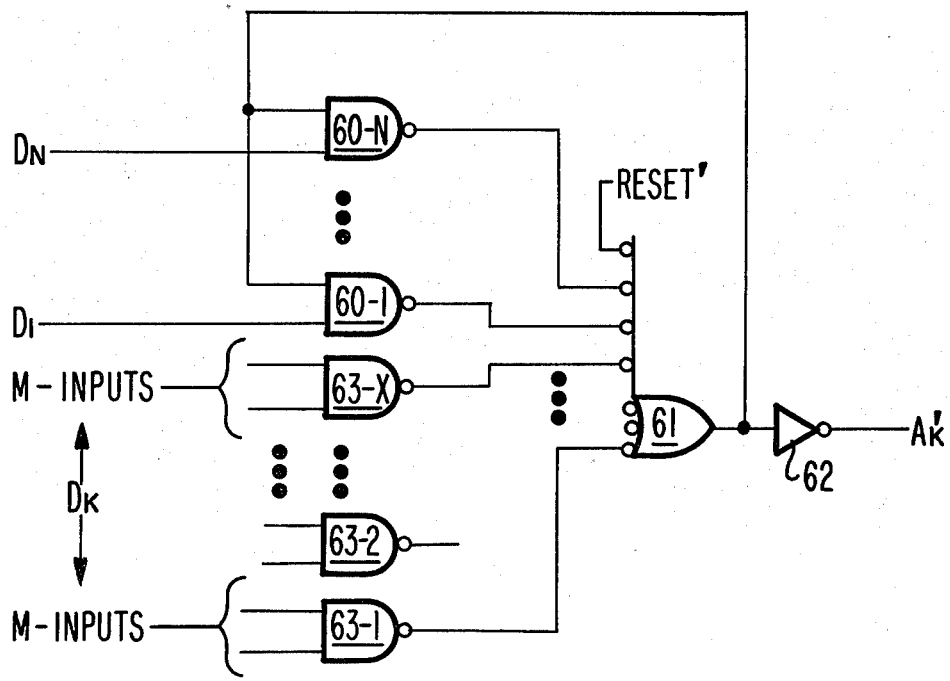
Figure 4C:
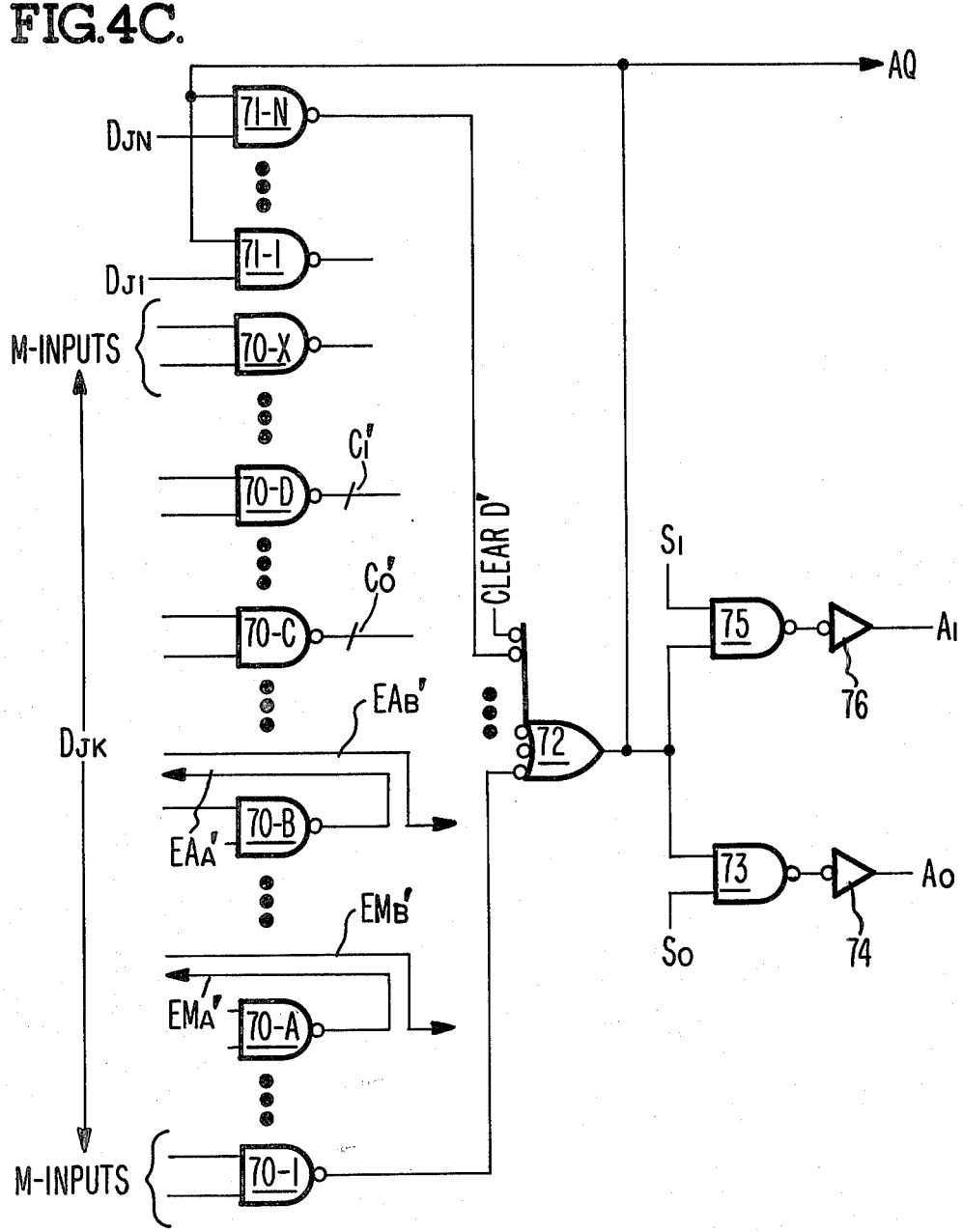
Figure 5:
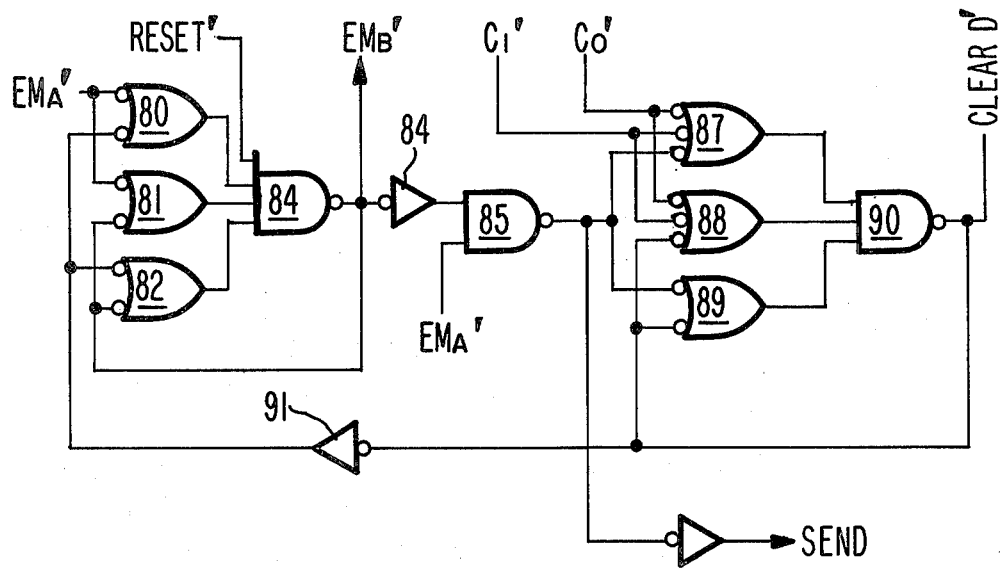

Consider now the logic circuitry of FIGS. 4A through 4C. FIG. 4A illustrates one bit of an N-bit wide queue. This queue receives characters on the input data lines from the selected input port and passes those characters to the output data lines of the output port. NAND gates 40–47 form an input buffer for the queue; whereas NAND gates 50–54 form an output buffer for the queue.

Again, the queue is N-bits wide. And to build the queue, the circuit of FIG. 4A is repeated N times, but with some variations. These variations enable any selectable control character $A_A$ to be inserted into a message as was described. That is, character $A_A$ can be any two codes out of the entire set that is possible by placing M-out-of-N of the input data lines in an active state. One of those codes will indicate that input port 11 was selected; whereas the other code will indicate that input port 12 was selected.

If the kth bit of both of those codes is a one, then the queue for that kth bit is formed exactly as illustrated in FIG. 4A. However, if the kth bit for both of those codes is a zero, then the queue for that kth bit is similar to that illustrated in FIG. 4A with the modification being that NAND gates 44 and 45 are eliminated.

Also, if the kth bit of the code that indicates input port 11 was selected is a one while the kth bit of the code that indicates input port 12 was selected is a zero, then signal $S_0$ is sent to the input of NAND gates 44 and 45. And, if the kth bit of the code that indicates input port 11 was selected is a zero while the kth bit of the code that indicates input port 12 was selected is a one, then signal $S_1$ is sent to the inputs of NAND gates 44 and 45. Also, gate 54 only appears once, and its output goes to all of the NAND gates 50 and 52.

Feedback from the queue's output buffer to the queue's input buffer is provided by the circuitry of FIG. 4B. That circuitry includes a plurality of NAND gates 60-1 through 60-N, 61, 62, and 63-1 through 63-X. Here, X is the number of combinations of N things taking M at a time.

Thus, each of the NAND gates 63-1 through 63-X detects one of the characters that may exist in the output queue. Accordingly, when the output of any one of the gates 63-1 through 63-X is low, the output buffer is full as indicated by signal $A_K'$ being true. Also, each of the gates 60-1 through 60-N is coupled to receive a respective bit in the output buffer of the queue.

One preferred means for generating control signals $A_0$ and $A_1$ to indicate when characters on the N input data lines of the selected input port are accepted and can change is illustrated in FIG. 4C. This circuit includes NAND gates 70-1 through 70-X, 71-1 through 71-N, and 72 through 76. Again in this notation, X represents the number of combinations of N things taking M at a time. These NAND gates are all interconnected as illustrated.

Each of the NAND gates 70-1 through 70-X detects one character that may exist in the queue's input buffer. Accordingly, a low on the output of any of the gates 70-1 through 70-X indicates that a character is present in the input buffer. Also, each of the gates 70-1 through 70-N is coupled to receive one respective bit in the input queue's buffer.

Note that four of the gates 70-1 through 70-X detect respective control characters. These gates are labelled 70-A, 70-B, 70-C, and 70-D. Gate 70-A detects end of message control character $C_{EM}$; gate 70-B detects end of address control character $C_{EA}$; and gates 70-C and 70-D detect control characters $C_0$ and $C_1$. They indicate which of the input ports was selected. All of these control characters are utilized by the circuits of FIGS. 3 and 6; and their operation will be described shortly.

First, however, to further understand how the circuits of FIGS. 4A through 4C operate, consider the following sequences. Initially, all of the input signals to the queue of FIG. 4A are in an inactive state. That is, signals $D_{0K}$, $S_0$, $D_{1K}$, $S_1$, and SEND are all low; and signal $A_K'$ is high. Then in response to any input data line going high on one of the input ports, either signal $S_0$ or $S_1$ goes high to indicate the selected port as was described in conjunction with FIG. 3.

Suppose, for example, that signal $S_0$ goes high. Then if the kth input data signal $D_{0K}$ goes high, the output of NAND gate 40 goes low and the output of NAND gate 47 goes high. NAND gate 47 generates signal $D_{JK}$ which is fed back through NAND gates 46 and 41 causing the input buffer to latch. Signal $D_{JK}$ is also sent to the NAND gates 70-1 through 70-X in the circuit of FIG. 4C. And when a total of M bits are present in the queue's input buffer, the output of one of those gates 70-1 through 70-X goes low.

That low causes the output of NAND gate 72 to go high; and that high is fed back through NAND gates 71-1 through 71-N thereby causing the output of NAND gate 72 to latch high. Also, the concurrence of a high signal $S_0$ and a high from the output of NAND gate 72 causes a low on the output of NAND gate 73 and a high on the output of gate 74. Thus, input control signal $A_0$ goes high indicating that the character on the input data lines has been received and can now change.

Next, consider the sequence of how characters are transferred from the input buffer to the output buffer. Assume initially that output buffer control signal A is high. Under that condition, the output of NAND gate 54 is low; and that low blocks the transfer of the input buffer's contents to the output buffer. But when signal A goes low, then the output of NAND gate 54 goes high. And then, the concurrence of two highs on the input of NAND gate 50 causes that gate to go low which in turn causes the output of NAND gate 53 to go high. This high is fed back through NAND gates 51 and 52 causing the output buffer to latch.

All of the output buffer data signals $D_K$ are then sent to NAND gates 63-1 through 63-X of FIG. 4B. And when M of those signals are high, the output of one of the NAND gates 63-1 through 63-X goes low. This low forces the output of NAND gate 61 high. And that high is latched through the feedback provided by NAND gates 60-1 through 60-N.

A high on the output of NAND gate 61 also forces the output of gate 62 low which, in turn, causes the output of NAND gates 46 and 40 to go high. When $D_{0K}$ changes low in response to $A_0$ having changed high, the output of NAND gate 41 will change to high causing NAND gate 47 to go low. All of the input buffer data bits $D_{JK}$ are sent to NAND gates 70-1 through 71-N. And when all of the signals $D_{JK}$ are low, the output of all of the NAND gates 70-1 through 71-N go high thereby forcing the output of NAND gate 72 low. This in turn forces input control signal $A_0$ low which indicates that the input buffer is clear and a new character can be presented on the input data lines. Also, a low on the output of NAND gate 72 returns the feedback that is provided by NAND gates 70-1 through 70-N to its initial state and so the FIG. 4C circuit is returned to its initial state.

Consider now how characters are removed from the queue's output buffer. To begin, output control signal A goes high. This in turn forces the output of NAND gate 54 low and that cuts off the feedback provided by NAND gates 50 and 52, causing them to change to high. When $D_{JK}$ changes to low as a result of the clearing of the input buffer, NAND gates 50 and 51 will change high. When NAND gates 50, 51, and 52 are all high, output signal $D_K$ goes low. NAND gates 60-1 through 60-N and 63-1 through 63-X sense for a low in all of the bits of the queue's output buffer. And when that occurs, the output of NAND gate 61 goes low. This in turn returns the feedback that is provided by NAND gates 60-1 through 60-N to its initial state and returns the FIG. 4B circuit to its initial state. Also, the output of NAND gate 62 goes high thereby enabling a new character to be received by the queue's input buffer.

Characters continue to pass from the queue's input buffer to the queue's output buffer in the above-described manner until control character $C_{EM}$ is received in the input buffer. When that occurs, the $C_{EM}$ character is passed to the output buffer; and one control character $A_A$ is generated in the queue's input buffer by the circuit of FIG. 5. Since this character $A_A$ is generated internally, no input control signal $A_0$ is sent for it. Then after the internally generated control character $A_A$ has passed from the input buffer to the output buffer, input control signal $A_0$ is forced low thereby enabling other control characters $A_A$ as generated by any preceding arbiters in the system to pass through the queue.

In detail, the above sequence occurs as follows. To begin, signal $D_{0K}$ goes high thereby causing signal $D_{JK}$ from the queue's input buffer to go high. All of the signals $D_{JK}$ are sent to the NAND gates 70-1 through 70-X of FIG. 4C. And there, NAND gate 70-A detects the control character $C_{EM}$. Note that the output of NAND gate 70-A does not go directly to the input of NAND gate 72; but instead, it is sent to the input of a NAND gate 80 in the circuit of FIG. 5. That entire FIG. 5 circuit consists of NAND gates 80 through 91 which are interconnected as illustrated.

NAND gate 81 has its output forced high in response to the detection of control signal $C_{EM}$ by NAND gate 70-A. And that high forces the output of NAND gate 83 low. NAND gate 83 has its output fed back to its input through NAND gates 81 and 82. Thus, the low on the output of NAND gate 83 is latched. Also, the low on the output of NAND gate 83 is sent as signal $EM_B'$ to NAND gate 72 of FIG. 4C. This in turn forces the output of NAND gate 72 high; which in turn causes the input control signal $A_0$ to go high.

In response to signal $A_0$ going high, all of the input data bits $D_{0K}$ go low. And when signal $A_K'$ goes low indicating that the content of the input buffer has been transferred to the output buffer, all of the signals $D_{JK}$ in the queue's input buffer go low. Normally when that occurs, NAND gate 72 in FIG. 4C changes to low; and thus the input control signal $A_0$ goes low. But in this case, signal $EM_B'$ from NAND gate 83 is latched low; and since that signal is sent to NAND gate 72, input control signal $A_0$ stays high.

However, when the signals $D_{JK}$ from the queue's input buffer go low, the output of NAND gate 70-A goes high. That output is sent to NAND gate 85 in the circuit of FIG. 5, and thus the output of NAND gate 85 goes low. This in turn forces the SEND signal from NAND gate 86 high and the output of NAND gate 89 high.

NAND gate 44 of the queue's input buffer is coupled to receive the SEND signal and the $A_K'$ signal. Thus when signal $A_K'$ goes high, indicating that the output buffer is empty, the output of NAND gate 44 goes low. This in turn sets signal $D_{JK}$ of the input buffer high. Recall now that there are four variations to the queue's input buffer. And these variations, as was previously described, enable any two codes $C_0$ and $C_1$ to be generated as the control character $A_A$ in the input buffer in response to the SEND signal. Those two codes indicate which of the input ports is selected.

NAND gates 70-C and 70-D in the FIG. 4C circuit detect the presence of codes $C_0$ and $C_1$ in the input buffer. And the output of those NAND gates is sent to NAND gates 87 and 88 in the FIG. 5 circuit. Thus when either of these control characters is present in the input buffer, the outputs of NAND gates 87 and 88 go high, which in turn forces the output of NAND gate 90 low.

A low on the output of NAND gate 90 is latched by NAND gates 88 and 89. And that low also forces a high from the output of NAND gate 91. In turn, this high from NAND gate 91 forces the output from NAND gate 83 high. Then, that high from the output of NAND gate 83 forces the SEND signal from NAND gate 86 low.

After the control character that was generated in the input buffer is transferred to the output buffer, signal $A_K'$ goes low. This in turn clears the input buffer; and thus all of the signals $D_{JK}$ go low. Then, the output of NAND gates 70-C and 70-D in FIG. 4C go high. Also, all of the outputs of NAND gates 71-1 through 71-N go high. Signals $C_0'$ and $C_1'$ go high on the input of NAND gate 87 in the FIG. 5 circuit. And this in turn forces the output of NAND gate 90 to a high. The high on signal CLEAR D' causes NAND gate 72 to go low, and input control signal $A_0$ goes low thereby indicating that another character can now be received on the input data lines. The high on CLEAR D' causes NAND gate 91 to change to low, thereby returning the FIG. 5 circuit to its initial state.

Thereafter, a control character $C_{EA}$ is eventually received in the input queue. That control character indicates that transmission from the selected input port is complete. Thus, in addition to passing control character $C_{EA}$ to the output port, the arbiter must deselect from the input port. This is achieved as follows.

Initially, control character $C_{EA}$ is detected in the input queue by NAND gate 70-B in circuit 4C and the output of that NAND gate is sent to NAND gate 100 in the circuit of FIG. 6. That entire circuit consists of NAND gates 100 through 116 which are interconnected as illustrated.

A low on the input of NAND gate 100 forces the output of that gate high; and that high in turn forces the output of NAND gate 102 low. That low is latched by the feedback provided by gate 100. And that low is also sent back to NAND gate 72 of the FIG. 4C circuit which in turn forces input control signal $A_0$ high. This allows control character $C_{EA}$ on the input data lines to be removed.

After character $C_{EA}$ has been transferred from the input buffer to the output buffer, signal $A_K'$ goes low. This in combination with the removal of character $C_{EA}$ from the input data lines forces signals $D_{JK}$ from the queue's input buffer low. Accordingly, the output of NAND gate 70-B in FIG. 4C which detects control character $C_{EA}$ goes high. And that high is received by NAND gate 104 in the FIG. 6 circuit which causes its output to go low. In turn, that low causes the output of NAND gate 108 to go high; and that high is latched by the feedback provided by NAND gates 105, 106, and 107.

A high on the output of NAND gate 108 causes the output of NAND gate 109 to go low. And that low is sent as signal $CLEAR_0'$ to the circuit of FIG. 3. There, signal $CLEAR_0'$ forces the output of NAND gates 20-1 through 20-N and NAND gate 21 to go high; and thus signal $R_0$ goes low. This low then forces the output of NAND gate 26 high which in turn enables the other input port to be selected through NAND gate 27. But the selection of that other input port is temporarily blocked by the low of signal $CLEAR_0'$ on NAND gate 30.

Signal $CLEAR_0'$ is also sent to NAND gate 116 in the FIG. 6 circuit. And that signal being low forces the output of NAND gate 116 high. This in turn makes the output of NAND gate 101 low, which makes the output of NAND gate 102 high. NAND gate 102 causes NAND gate 103 to change low and has signal $EA_B'$ sent to NAND gate 72 of FIG. 4C. Thus, NAND gate 72 goes high, which in turn forces the input control signal $A_0$ low and causes a low on signal AQ to be sent to the circuit of FIG. 6. Thus, the previously selected input port has been returned to its initial state.

Also in response to the high on the output of NAND gate 26 in the FIG. 3 circuit, transistor 32 turns on. Thus, the output of NAND gate 29 goes low. NAND gate 29 has its output sent to NAND gates 104 and 105 of FIG. 6. Thus, the outputs of those NAND gates go high, which in turn forces the $CLEAR_0'$ signal from NAND gate 109 high. NAND gate 116 changes low, and NAND gate 101 changes high. This returns the FIG. 6 circuit back to its initial state; and it also removes the blocking signal from NAND gate 30 in FIG. 3 which enables the corresponding input port to be selected.

All of the details of one preferred embodiment of the invention have now been described. But in addition, however, many changes and modifications can be made to those details without departing from the nature and spirit of the invention. Accordingly, it is to be understood that the invention is not limited to said details but is defined by the appended claims.

What is claimed is:

1. An arbiter comprised of:
   two input ports and one output port, each of said input ports having N input data lines and said one output port having N output data lines;
   means for selecting only one of said two input ports at a time in response to an active logic signal on any one of the N input data lines in that port when neither input port is already selected; and
   means for passing the bits of multibit characters from said selected input port to said output port in parallel and in synchronization with each other;
   each of said multibit characters being represented by active logic signals that asynchronously occur with respect to each other on M-out-of-N data lines on said selected input port, with M being at least two and N being greater than M and greater than three.

2. An arbiter according to claim 1 wherein said means for passing includes an N-bit wide queue means for receiving characters from said selected input port and for transmitting said received characters to said output port.

3. An arbiter according to claim 1 wherein each of said input ports further includes one input control line, and wherein said means for passing includes means for generating control signals on said one input control line of said selected input port indicating when characters on the N input data lines of said selected input port are accepted and can change.

4. An arbiter according to claim 1 wherein said output port further includes one output control line, and wherein said means for passing includes means for generating characters on said N output data lines of said output port in response to signals on said one output control line.

5. An arbiter according to claim 1 and further including means for detecting a predetermined character on said N input data lines of said selected input port and in response thereto for generating one of two characters on said N output data lines of said output port indicating which input port is selected.

6. An arbiter according to claim 1 and further including means for detecting a predetermined character on said N input data lines of said selected input port and in response thereto for deselecting from said selected input port.

7. An arbiter comprised of:

two input port means and one output port means;

each of said input port means including N input data lines for receiving sequences of externally generated multibit characters of the form $A_S \ldots A_S M \ldots M C_{EM} A_A \ldots A_A C_{EA}$, said characters $A_S$, M, $C_{EM}$, $A_A$ and $C_{EA}$ being represented by active logic signals that asynchronously occur with respect to each other on M-out-of-N of said N input data lines with M being at least two and N being greater than M and greater than three;

said output port means having N output data lines and including:

means for passing the multiple bits of the respective characters from either of said two input port means to said one output port means in parallel and in synchronization with each other, and means for generating one of two selectable characters on said output port immediately after said $C_{EM}$ character is passed thereto to identify the input port that said character sequence is being passed from.

8. An arbiter comprised of:

two input ports and one output port, each of said input ports having N input data lines and said one output port having N output data lines;

means for selecting only one of said two input ports at a time; and means for passing the bits of multibit characters from said selected input port to said output port including an N-bit wide queue means for asynchronously receiving the bits of each character from said selected input port and for transmitting the received bits of each character in parallel and in synchronization with each other to said output port;

each of said multibit characters being represented by active logic signals that asynchronously occur with respect to each other on M-out-of-N data lines on said selected input port, with M being at least two and N being greater than M and greater than three.

9. An arbiter comprised of:

two input ports and one output port, each of said input ports having N input data lines and said one output port having N output data lines;

means for selecting only one of said two input ports at a time; and means for passing the bits of multibit characters from said selected input port to said output port in parallel and in synchronization with each other;

each of said multibit characters being represented by active logic signals that asynchronously occur with respect to each other on M-out-of-N data line on said selected input port, with M being at least two and N being greater than M and greater than three;

each of said input ports further including one input control line, and said means for passing including means for generating control signals on said one input control line of said selected input port indicating when the asynchronous bits of each character on the N input data lines of said selected input port are accepted and can change.

* * * * *